(12) United States Patent
Neal et al.

(10) Patent No.: US 6,631,365 B1
(45) Date of Patent: Oct. 7, 2003

(54) METHOD AND APPARATUS FOR ANALYZING THE QUALITY OF THE CONTENT OF A DATABASE

(75) Inventors: Michael Renn Neal, Superior, CO (US); Gregg Menin, Broomfield, CO (US)

(73) Assignee: Requisite Technology, Inc., Westminster, CO (US)

( * ) Notice: Subject to any disclaimer, the term of this patent is extended or adjusted under 35 U.S.C. 154(b) by 0 days.

(21) Appl. No.: 09/525,074

(22) Filed: Mar. 14, 2000

(51) Int. Cl.[7] ............................................. G06F 17/30
(52) U.S. Cl. .................................. 707/2; 707/5; 707/6
(58) Field of Search ...................................... 707/1–10

(56) References Cited

U.S. PATENT DOCUMENTS

| | | | |
|---|---|---|---|
| 5,412,806 A | 5/1995 | Du et al. ..................... | 395/600 |
| 5,418,941 A | 5/1995 | Peters ........................ | 395/575 |
| 5,423,035 A | 6/1995 | DePrez ....................... | 395/600 |
| 5,701,471 A | 12/1997 | Subramanyam ............. | 395/616 |
| 5,724,262 A | 3/1998 | Ghahramani ........... | 364/551.01 |
| 5,734,884 A | 3/1998 | Eberhard et al. ........... | 395/602 |
| 5,808,908 A | 9/1998 | Ghahramani ........... | 364/551.01 |
| 5,819,066 A | 10/1998 | Bromberg et al. .......... | 395/500 |
| 5,852,818 A | 12/1998 | Guay et al. .................... | 707/1 |
| 5,884,299 A | 3/1999 | Ramesh et al. ................ | 707/2 |
| 5,933,836 A | 8/1999 | Gobat ........................ | 707/201 |
| 5,983,220 A | 11/1999 | Schmitt ......................... | 707/5 |
| 5,987,251 A | 11/1999 | Crockett et al. ............ | 395/704 |
| 6,003,022 A | 12/1999 | Eberhard et al. .............. | 707/2 |
| 6,026,235 A | 2/2000 | Shaughnessy ............... | 395/704 |
| 6,026,398 A | 2/2000 | Brown et al. ................... | 707/5 |
| 6,169,992 B1 | 1/2001 | Beall et al. ................. | 707/103 |
| 6,236,990 B1 * | 5/2001 | Geller et al. .................... | 707/5 |

FOREIGN PATENT DOCUMENTS

WO  WO9849632 A  11/1998  ........... G06F/17/30

OTHER PUBLICATIONS

IBM Technical Disclosure Bulletin, "Software Component Library and Electronic Library Catalog", vol. 40 No. 6, Jun. 1997, pps. 27–29.

EPO Search Report, EP01304398, Apr. 11, 2002, pps.

Poyhonen et al., "On the convergence of multiattribute weighting methods", XP–002156267, Apr. 1997, pps. 1–15.

* cited by examiner

*Primary Examiner*—Safet Metjahic
*Assistant Examiner*—Marc Fiilipczyk
(74) *Attorney, Agent, or Firm*—Blakely, Sokoloff, Taylor & Zafman LLP (57) ABSTRACT

The present invention provides a method for scoring a searchable electronic catalog such as are in use in e-commerce and industrial materiel systems. Such catalogs are typically configured as databases which the present invention analyzes for a quality, for example, completeness, consistency or comprehensibility. The method includes selecting fields of the database that are to be analyzed, ranking the fields in order of pertinence to the quality that is to be measured, fetching values for each record of the database from the fields that are to be analyzed and comparing the fetched values to a standard. After the comparison, a score is assigning for each field based on the comparison. The scores are weighted for each field based on the rank of each field and the weighted scores are combined to obtain a score for the database. A variety of different qualities can be evaluated and the resulting scores can be used to compare databases or to localize deficiencies in databases for improvement.

22 Claims, 5 Drawing Sheets

METHOD AND APPARATUS FOR ANALYZING THE QUALITY OF THE CONTENT OF A DATABASE

FIELD OF THE INVENTION

This invention relates to electronic databases in general, and more specifically to a method and apparatus for analyzing the content of a database for various qualities such as comprehensibility, completeness and consistency which bear on the usefulness of the database in comparison to other databases.

BACKGROUND OF THE INVENTION

Searchable electronic catalogs are commonly used in support of electronic commerce and purchasing functions. These electronic catalogs can be created from printed catalogs, spreadsheets, text documents, databases or lists and typically are rendered into databases, HTML page collections and other electronic means. Individual purchaser or marketplace system installations frequently contain several catalogs from several sources. For example, an office supply installation may contain office supply catalogs from several different office supply vendors or manufacturers. Some of the catalogs may describe identical items such as a blue pen while each catalog will likely describe similar but different items, such as different makes of blue pens. These catalogs may vary in their quality and usability as measured by the ability of users to find and purchase items. An objective measurement of the qualities of each catalog allows one to compare catalogs and identify catalog deficiencies quickly. With sufficient support, such analyses can quickly localize the source of the deficiency.

Three critical aspects of catalog usage are purchasing, item identification and validation, and finding. Sufficient information must be present in the catalog for describing an item so that a user or a prospective buyer can find the item. A catalog supplier strives to present a catalog that maximizes the likelihood that items will be found, identified and then purchased. The information needed for a purchase may be only a part number or include very detailed item descriptions with images and interactive applications. Catalogs that support a greater amount of specific information generate greater sales so they are scored higher in evaluating the catalog's usefulness and in evaluating the key attribute of how easy it is for a purchaser to find the item that is sought.

SUMMARY OF THE INVENTION

In a preferred embodiment, the present invention provides a method for scoring a database for a quality, for example, completeness, consistency or comprehensibility. The method includes selecting fields of the database that are to be analyzed, fetching values for each record of the database from the fields that are to be analyzed and comparing the fetched values to a standard. Preferably, after the comparison, a score is assigning for each field based on the comparison. The fields are ranked in order of pertinence to the quality that is to be measured and the scores are weighted for each field based on the rank of each field. The weighted scores are finally combined to obtain a score for the database.

Where the quality to be analyzed is completeness, the invention includes comparing fetched values for a field to other fetched values for the same field. Assigning a score comprises assigning points for each null value so that the score a for a field corresponds to the number of null values for all records in that field.

Where the quality to be analyzed is consistency, the invention includes comparing the fetched values for a field to a dictionary of possible values. Assigning a score comprises assigning points for each fetched value that does not match a dictionary value so that the score a for a field corresponds to the number of non-matching values for all records for that field.

Where the quality to be analyzed is comprehensibility, the present invention includes comparing the fetched values for a field to a dictionary of possible values and assigning a score comprises assigning points for each fetched value that does not match a dictionary value so that the score a for a field corresponds to the number of non-matching values for all records for that field.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while embodiments of the present invention will be described with reference to analyzing the quality of a catalog for finding and identifying items of particular interest to users such as potential customers, the method and apparatus described herein are equally applicable to the analysis of any sort of database for which particular qualities are to be measured. For example, the techniques described herein are thought to be useful in connection with databases for client or customer management, for inventory management and for transportation management and scheduling.

The present invention is preferably implemented in Java software instructions although any other computer programming language can be used. The Java code can be run on a wide variety of computer systems. An example of such a computer system upon which the present invention may be implemented will now be described with reference to FIG. 1. The computer system comprises a bus or other communication means 1 for communicating information, and a processing means such as a processor 2 coupled with the bus 1 for processing information. The computer system further comprises a random access memory (RAM) or other dynamic storage device 4 (referred to as main memory), coupled to the bus 1 for storing information and instructions to be executed by the processor 2. The main memory 4 also may be used for storing temporary variables or other intermediate information during execution of instructions by the processor 2. The computer system may also include a read only memory (ROM) or other static storage device 6 coupled to the bus 1 for storing static information and instructions for the processor 2.

Figure 1:
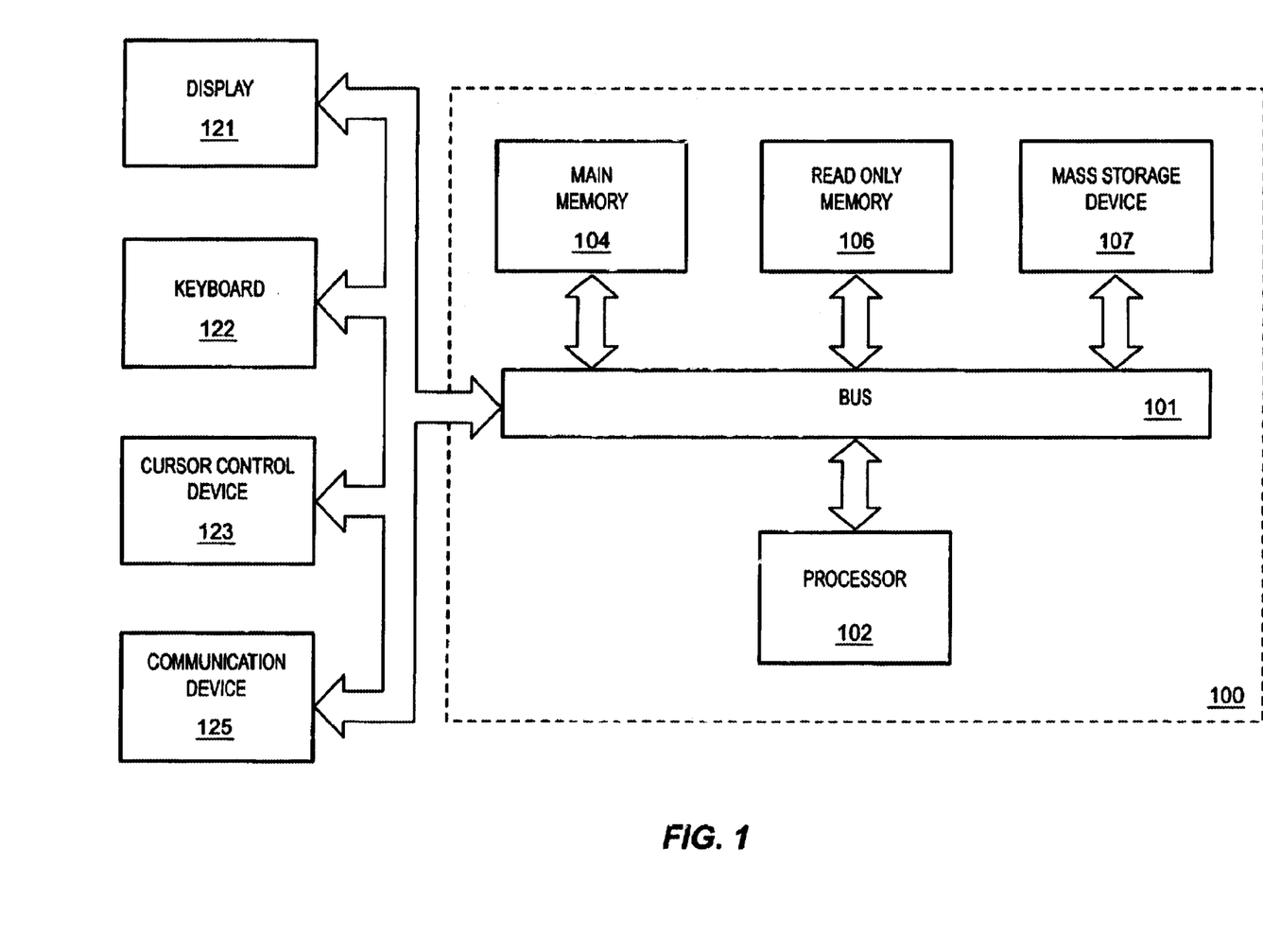
FIG. 1 is an example of a typical computer system upon which one embodiment of the present invention may be implemented.

A data storage device 7 such as a magnetic disk or optical disc and its corresponding drive may also be coupled to the computer system for storing information and instructions. The computer system can also be coupled via the bus 1 to a display device 21, such as a cathode ray tube (CRT) or Liquid Crystal Display (LCD), for displaying information to an end user. For example, graphical and textual indications of installation status, time remaining in the trial period, and other information may be presented to the prospective purchaser on the display device 21. Typically, an alphanumeric input device 22, including alphanumeric and other keys, may be coupled to the bus 1 for communicating information and command selections to the processor 2. Another type of user input device is a cursor control 23, such as a mouse, a trackball, or cursor direction keys for communicating direction information and command selections to the processor 2 and for controlling cursor movement on the display 21.

A communication device 25 is also coupled to the bus 1. The communication device 25 may include a modem, a network interface card, or other well known interface devices, such as those used for coupling to Ethernet, token ring, or other types of physical attachments for purposes of providing a communication link to support a local or wide area network, for example. In any event, in this manner, the computer system may be coupled to a number of clients or servers via a conventional network infrastructure, such as a company's Intranet or the Internet, for example.

It may be appreciated that a lesser or more equipped computer system than the example described above may be desirable for certain implementations. Therefore, the configuration of the computer system will vary from implementation to implementation depending upon numerous factors, such as price constraints, performance requirements, technological improvements, and other circumstances.

It should be noted that, while the steps described herein may be performed under the control of a programmed processor, such as the processor 2, in alternative embodiments, the steps may be fully or partially implemented by any programmable or hard coded logic, such as Field Programmable Gate Arrays (FPGAs), TTL logic, or Application Specific Integrated Circuits (ASICs), for example. Additionally, the method of the present invention may be performed by any combination of programmed general purpose computer components or custom hardware components. Therefore, nothing disclosed herein should be construed as limiting the present invention to a particular embodiment wherein the recited steps are performed by a specific combination of hardware components.

The present invention is directed toward analyzing lists of data, and in a preferred embodiment, to analyzing electronic catalogs. The catalog can exist as a database or in any other electronic format, such as a spreadsheet or text. Where there is no electronic format, paper catalogs or text documents can be scanned into electronic form and then processed to a standardized list of items with their descriptions. The present application will describe the invention in terms of a database. In the context of the present invention, the term database should not be construed as limited to any particular type of structure but rather in a broader sense as a list or a sequence in which items are accompanied by descriptions. Such a database can be viewed, for example, as a collection of two-dimensional tables in which each row represents a different record and each column represents a different field. Each record corresponds to a particular item. In the case of a catalog of office supplies, a record provides the catalog information for a particular office supply such as a particular pen. Different pens each have a different record. For each record, there are several fields. Each field describes an attribute of the item that corresponds to the record, such as price, color, weight, size etc. The present invention analyzes the values that are entered into the fields of the database.

Figure 2:
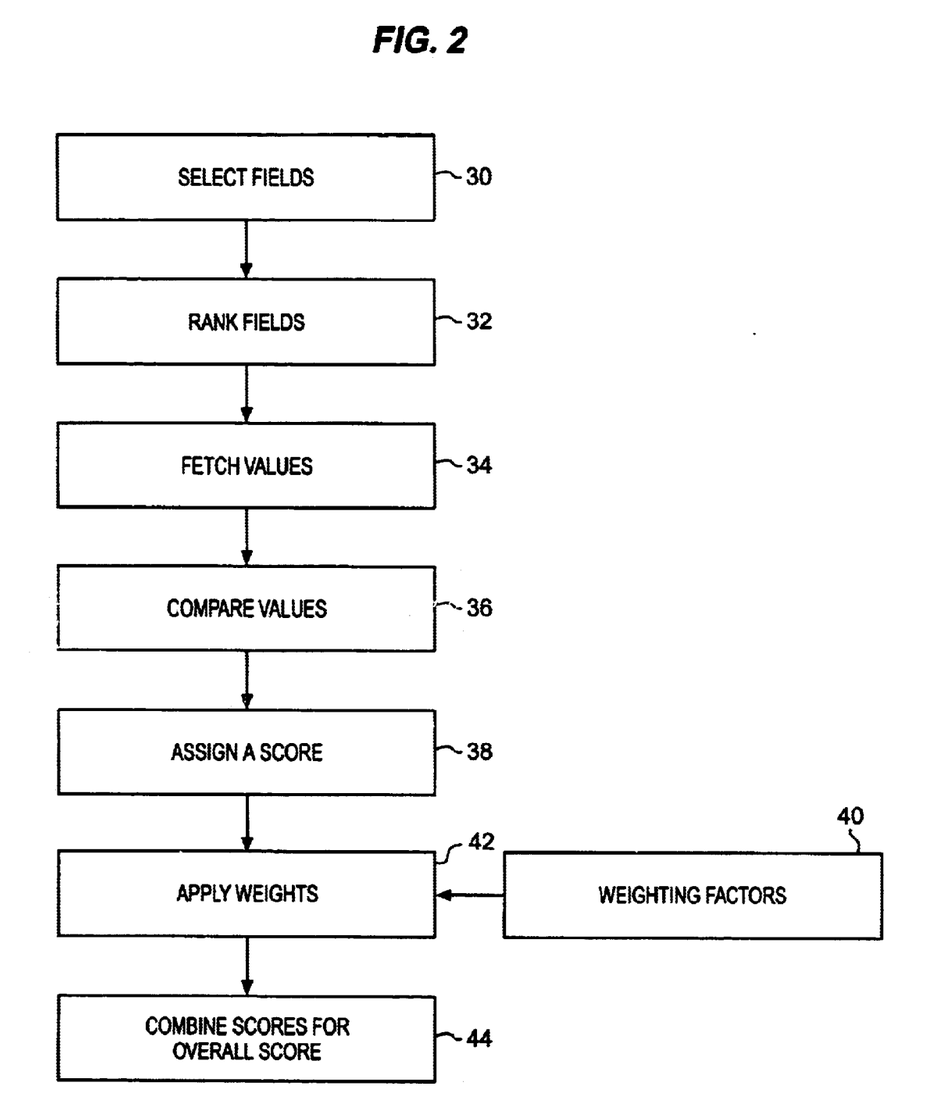
FIG. 2 is a flow diagram showing one embodiment of the present invention.

FIG. 2 shows an application of the present invention, in general, to analyzing a quality of a database. In FIG. 2 the process begins with selecting the fields that are to analyzed 30. Typically, not all fields are given the same importance, as will be appreciated in the examples that follow. After the fields are selected, they are ranked in order of importance 32. The present invention looks at deficiencies, excesses, and variability in the values of the fields of the database and, in order to provide a meaningful score, different fields must be accorded differing levels of importance in the scoring. Each field is given a weight, based on its ranking and this weight is used in determining the final score. After the fields are selected and ranked, the values in the database for each of the selected fields is fetched 34 and then analyzed through a process of comparison 36. The particular type of comparison will depend upon the particular quality that is being analyzed. After the comparison, a score is assigned 38 based on the comparison. This score is the basic input into the overall score for the database. As mentioned above, the ranking of the fields is used to assign weighting factors to each of the fields 40. These weighting factors are preferably recorded in a table which is used to apply weights to each of the scores 42. It is presently preferred that the weights all constitute a multiplication factor between zero and one, however, the numerical scaling can be done in a variety of different ways. Finally, the weighted scores are combined 44 to produce an overall score for the database for the particular quality being analyzed. Scores for multiple qualities can be combined to provide a more comprehensive score of the database. The results can also be normalized to facilitate comparisons between different databases or electronic sources.

In a preferred embodiment, the invention can be used to measure the ease with which items in a catalog can be found. Preferably three components are analyzed. Completeness looks to see if attributes and field values for catalog items exist in the catalog, or, in other words, whether important fields for each record contain data entries. Emphasis is placed on attributes critical to finding and purchasing such as SKU (Stock Keeping Unit), Price, Supplier Name, and Description. A catalog, which is missing these items (contains null field values) will be more difficult to use. Consistency looks for the consistent use of common abbreviations and units of measure. Comprehension looks at how the product is described by evaluating word usage. Words, including units of measure and common abbreviations, in the description fields are examined using a dictionary and parts of speech are analyzed for appropriateness and count.

Figure 3:
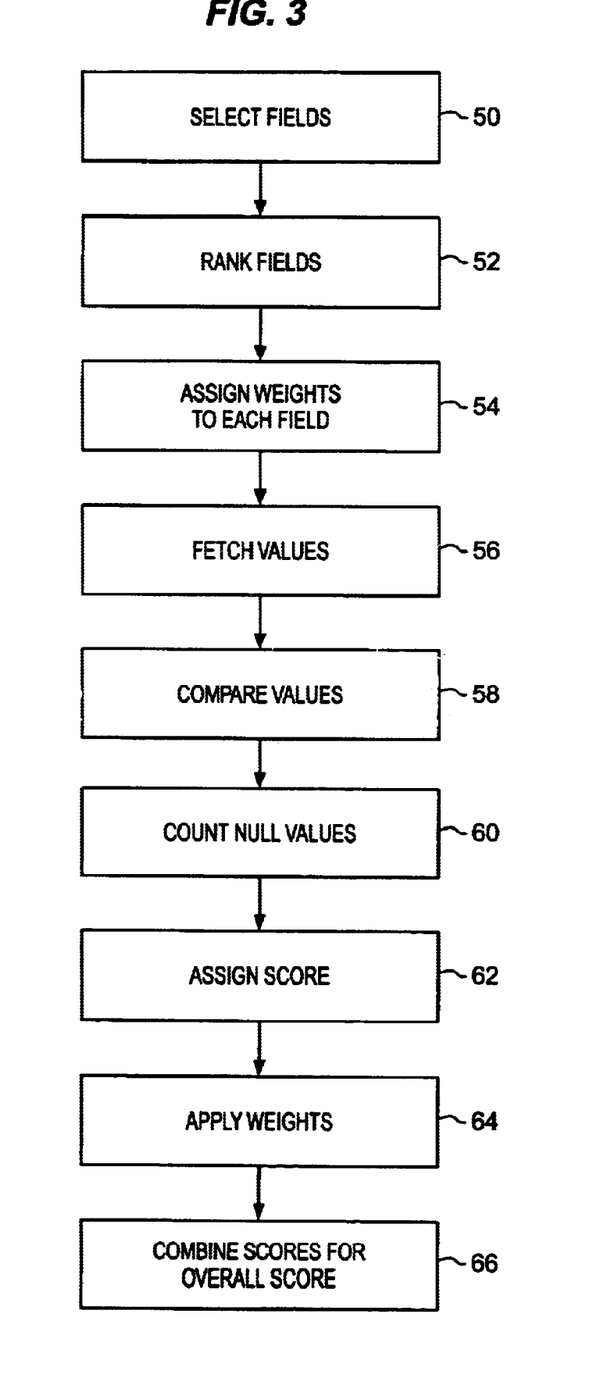
FIG. 3 is a flow diagram showing an application of the present invention for measuring completeness.

FIG. 3 shows an example of a flow chart for analyzing completeness. Preferably, in the example of analyzing an electronic catalog, the completeness analysis is a check for the existence of all attributes of products that are required to make a purchase, as well as the existence of field values that enhance the ability to find a product.

In FIG. 3 the process of analyzing a database for the quality of completeness begins with selecting the fields that are to analyzed 50. Typically, for the example of an electronic catalog, the fields of SKU, Price, Supplier Name, and Description would be selected. However, the particular selected fields will depend upon the particular database to be analyzed and the fields which are considered to be most important. After the fields are selected they are ranked in order of importance 52. Typically, the ranking would be SKU, Price, Supplier Name, and Description. The particular database, domain of the database content, and the ranking of the fields will depend on the particular database and the purpose of the analysis. Weights are next assigned 54 based on the rankings. Examples of weights to apply would be SKU: 1.0, Price: 0.75, Supplier Name: 0.5, and Description: 0.25.

After the fields are selected and ranked, the values in the database for each of the selected fields is fetched 56 and then analyzed through a process of comparison 58. Specifically, the value of the field is compared to a null value, i.e., a determination is made as to whether there is any data entered into the field for the particular field. Then a count is made of all of the null values for each field 60. A score is assigned 62 based on the comparison. Preferably, the score is simply the number of values that are not null for each field. Weighting factors are preferably applied to each of the scores 64. Finally, the weighted scores are combined 66 to produce an overall completeness score for the database being analyzed.

A mathematical example of determining a completeness score where three different fields are being analyzed follows.

The completeness score=$(w1*f1(n)+w2*f2(n)+w3*f3(n))/(w1+w2+w3)$

Where $f1(n)=\Sigma([$all first group fields$]*[$count of first group fields with non-null values per record$]*[$count of records being evaluated (i.e. products in the catalog)$])/([$all first group fields$]*[$count of records being evaluated$])$ $f2(n)=\Sigma([$all second group fields$]*[$count of second group fields with non-null values per product$]*[$count of products being evaluated (i.e. a catalog)$])/([$all second group fields$]*[$count of products being evaluated$])$ $f3(n)=\Sigma([$all third group fields$]*[$count of third group fields with non-null values per product$]*[$count of products being evaluated (i.e. a catalog)$])/([$all third group fields$]*[$count of products being evaluated$])$ and where w1, w2 and w3 are the corresponding weights for the first to the third fields respectively.

A detailed report of completeness would typically show the percent completion (values not null) for all selected fields, a list of the selected fields, and the percent completion of all fields by category. In addition, the number of items missing key attributes in a field, number of items with rich content (i.e. pictures) and the number of items without categories may be shown. Finally, the percent completion of all fields by score can be provided. This can be used to focus data value improvement efforts on those areas that most need it.

It may also be desired to produce scores on the basis of domains, categories or attributes. For a catalog that spans several domains, it may be useful to understand which domains have the greatest level of completion and which domains require the most improvement. Within a particular domain, a catalog user or creator may benefit by understanding which categories of goods or services may benefit most from remediation. Attributes (descriptors or specifications) which relate to groups of fields present another useful basis for reporting to a catalog user or creator. If the incomplete fields belong to attributes that are common across the catalog, such as SKU and price a different remedial effort may be required than if the incomplete fields relate to category specific attributes such as color or power.

Figure 4:
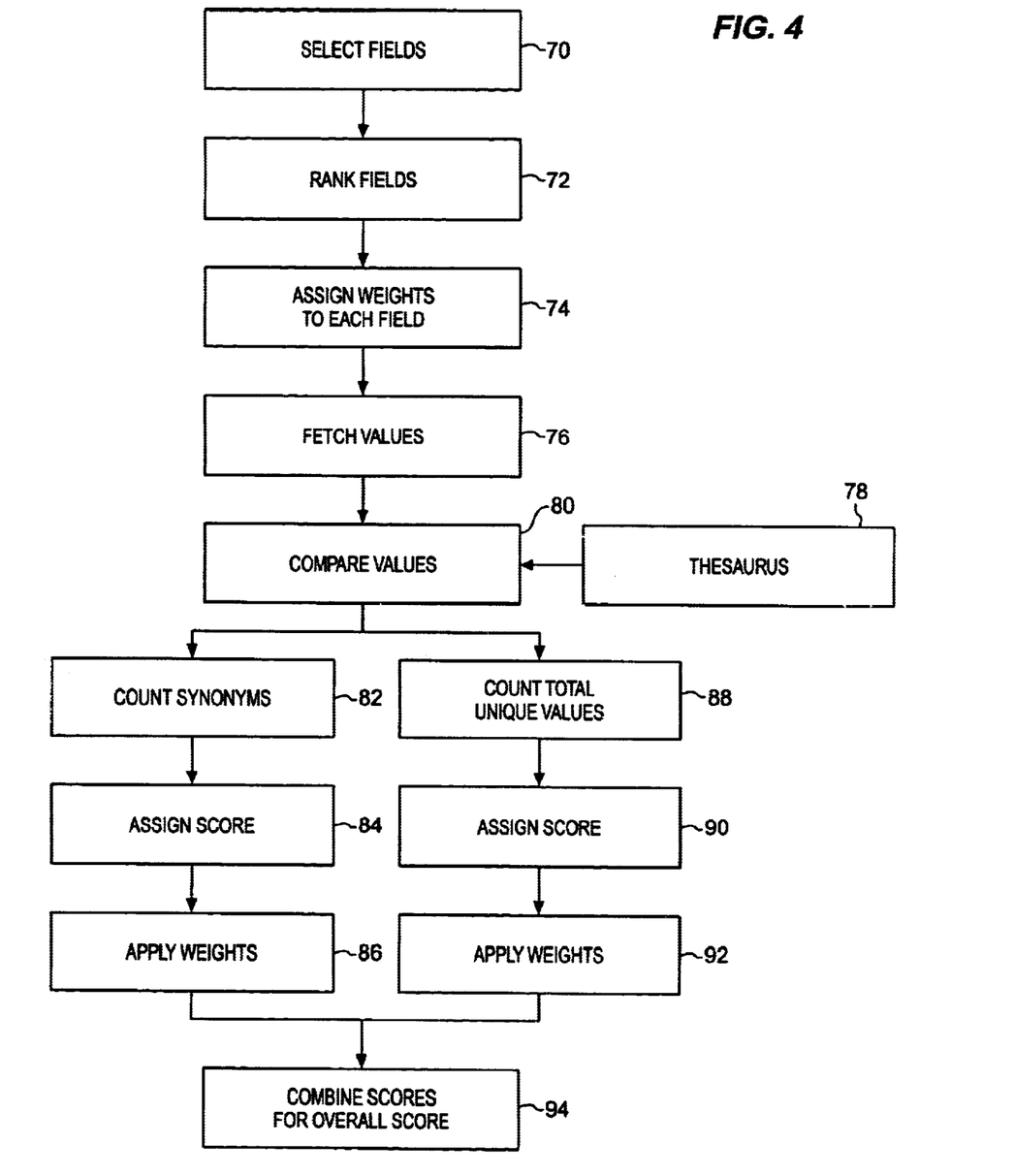
FIG. 4 is a flow diagram showing an application of the present invention for measuring consistency.

FIG. 4 presents an application of the present invention to analyze consistency. Catalog users generally prefer consistency in the manner in which items are described. This promotes confidence that when a user searches for a product description, all items like the desired product are found and displayed. The first element of consistency is in the usage of words, units of measure, and abbreviations, for example using ft., F., FT. or foot. Unnecessary or inconsistent uses of synonyms, that is using synonyms that do not convey differences in the products, are distracting and interfere with efficient use of the catalog. The use of abbreviations with multiple possible meanings (such as CT=Carton or Crate or Connecticut) can create ambiguities that also interfere with efficient use of the catalog. The present invention, using a thesaurus defined by the user as a database of synonyms, can score synonym usage.

Consistency in abbreviation usage is desirable, both for catalog consistency and for avoiding ambiguity. A table of abbreviations may be created with the preferred abbreviations noted. Scoring of this component of consistency may be based on the ratio of preferred abbreviations to the total abbreviations. Frequency with which unique pairings occur is a second method. Combining several methods allows for a weighted score for the entire consistency component.

In FIG. 4, the process of analyzing a database for the quality of completeness begins with selecting the fields that are to analyzed 70. Typically, for the example of an electronic catalog, the fields which contain units of measure and abbreviations would be selected. For a catalog, fields for dimensions, colors, types and shipping data may be selected. After the fields are selected, they are ranked in order of importance 72. The particular fields selected and the ranking of the fields will depend on the particular database and the purpose of the analysis. Weights are next assigned 74 based on the rankings. Examples of weights to apply would be Size: 1.0, Weight: 0.75, Color: 0.5, and Shipping Orders: 0.25.

After the fields are selected and ranked, the values in the database for each of the selected fields is fetched 76 and then analyzed through a process of comparison 80. Specifically, the value of each field is compared to values in a thesaurus 78. The thesaurus is specifically designed for the type of catalog being analyzed. It may be provided by the catalog's creator or it may be based on the needs of a particular user of the catalog. Preferably the thesaurus contains a complete listing of synonyms that are well understood in the field for units of measure and abbreviations. A different thesaurus may be required for different categories or domains.

In the comparison, a determination is made as to whether a unit of measure or abbreviation value from each record matches an entry in the thesaurus. Then a count is made of all of the different matching values for each field 82. A score is assigned 84 based on the number of matches. Preferably, the score is simply the number of values that find a match in the thesaurus for each field divided by the total number of non-null values. Weighting factors are then applied to each of the scores 86. Another score that can be developed from the comparison 80 is a count 88 of all of the unique values in each field. For example, the unit of measure value "lb.", "Lb.", "pd." and "pound" are added together to form a count of four no matter how many times each of these values occurs in the weight field. This total number of unique values are assigned scores 90, so that a larger number of synonyms generates a lower score. A preferred score is an aggregate of the number of synonym groups divided by the count of synonyms found for each of the synonym groups. A synonym group is, for example, weights in pounds and the synonyms are the various ways of expressing pounds above (lb., Lb., pound etc.) The score is then weighted 92 in the same manner as the total number of matches. Finally, the weighted scores are combined 94 to produce an overall consistency score for the database being analyzed. The overall consistency score preferably reflects a ratio that is (count of redundant abbreviation & units of measure)/(count of unique abbreviation & units of measure) A complete mathematical analysis would be very similar to that presented above for completeness.

A detailed consistency report for a catalog preferably shows per category and per attribute:

Number of abbreviations

Number of unique abbreviations

Number of redundant abbreviations

Number of units of measure

Number of unique units of measure

Number of redundant units of measure

A third example quality to analyze is comprehension. In one method to analyze comprehension, the present invention looks to see if the item descriptions in the catalog use native language words, and if the variety of words is consistent with the size of the catalog. Numbers and alphanumeric strings are excluded from the analysis as are known units of measure and abbreviations. Numbers are assumed to be either part numbers or values associated with descriptors. Alphanumeric strings are assumed to be part numbers. Units of measure and abbreviations are dealt with in the consistency evaluation discussed above.

Additional analysis can be generated to look at the usage of nouns and adjectives in describing items. The present invention can also analyze optimal value ranges for describing items in a given domain and the relationship between the number of unique nouns and the number of categories. In this case a grade can be associated with the percent of unique words in that are found in the dictionary. Each recurrence of a word is not counted. Other factors to include are the number of words in the catalog, the number of unique words in the catalog, the number of nouns used per record or item as distinguished by having a unique SKU and the number of adjectives per record. This last measure can also be considered by measuring the percentage of records that are described with at least one word. For catalogs with which users prefer written descriptions, a statistical count of the extent of the descriptions is valuable. All of these measure are preferably sorted by category and by attribute to provide the most useful measure to the user and creator of the catalog.

Figure 5:
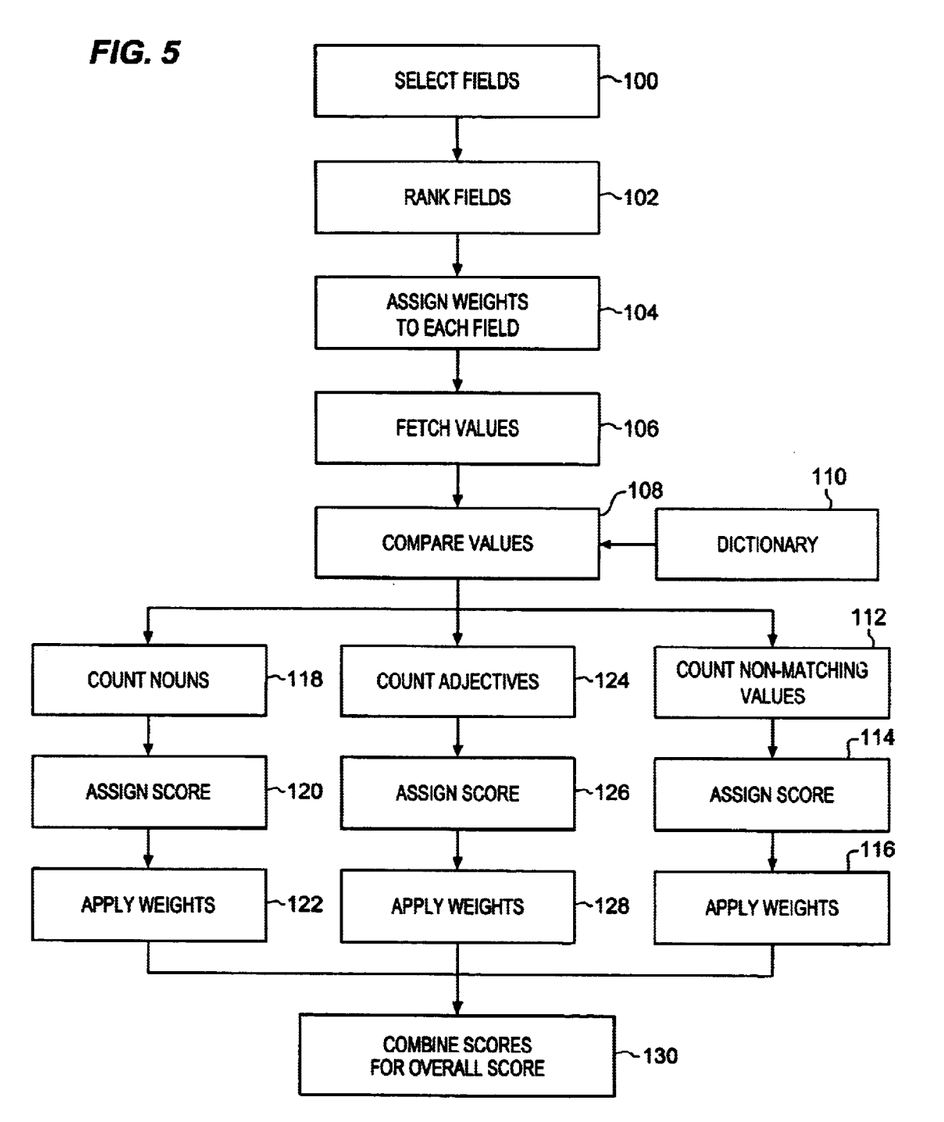
FIG. 5 is a flow diagram showing an application of the present invention for measuring comprehensibility.

In FIG. 5, the process of analyzing a database for the quality of comprehension begins with selecting the fields that are to analyzed 100. Typically, for the example of an electronic catalog, the fields which contain text descriptions would be selected. In a database, this information may be spread over several fields associated with the product so all the fields can be examined in their entirety. Users can select which fields are appropriate for the particular situation. Furthermore, parts of speech across the entire catalog can be analyzed as an indication of a catalog's ability to differentiate between similar items. Text components of product descriptions can be evaluated for sufficiency as well as consistency. Sufficiency is providing enough description to effectively describe a product, as well as to effectively differentiate items within a catalog. Examining the number and variance of each part of speech (noun, adjective, etc) on a per item basis provides some indication of the degree of information conveyed about that item. After the fields are selected, they are ranked in order of importance 102. Weights are next assigned 104 based on the rankings. After the fields are selected and ranked, the values in the database for each of the selected fields is fetched 106 and then analyzed through a process of comparison 108 to a dictionary 110. The dictionary is specifically designed for the type of catalog being analyzed.

In the comparison, a determination is made as to whether each word for each record matches an entry in the dictionary 112. Then a count is made of all of the different matching values for each field 114. A score is assigned 114 based on the number of matches. Preferably, the score is simply the number of values that find a match in the dictionary for each field. Weighting factors are then applied to each of the scores 116.

Another score that can be developed from the comparison 108 is a count 118 of all of the nouns in each field. The dictionary comparison can be used to determine the word's part of speech. The noun counts are assigned scores 120, preferably simply the count, and then weighted 122 in the same manner as the total number of matches. In addition, the adjectives are counted 124, assigned a score for each field 126 and properly weighted 128. Finally, all of the weighted scores are combined 130 to produce an overall comprehension score for the database being analyzed. Scoring may be based on the ratio of found words to total words, found unique instances of words to total unique words, and ratios after filtering for non-language text such as part number and non descriptive (or otherwise un-interesting text such as conjunctions and prepositions.

Scoring is based on a value driven methodology in which the score for each component is normalized. As scoring components are aggregated into larger representations, each aggregated score is renormalized. Any component consisting of multiple elements has weighting applied to reflect the relative value of that element in relation to other catalog elements. Weights are applied at all levels of scoring aggregation. Users are permitted to configure relative weights of the scoring (value weighting and normalization). There are additional methods for evaluating the sufficiency of item descriptions. Among these are examinations of description length, by both character and word count, and comparing this to an expected value (range) or an existing, calculated distribution. Such evaluations may be performed over one or more fields, and by category, catalog, catalog set, or other grouping defined by the user.

Different applications and domains have different requirements for finding and purchasing. The scoring system is preferably configurable to reflect the values of each particular environment. Domain and application experts apply their own evaluation of the relative importance of the components of catalog scoring.

In the description above, three basic quality attributes are scored. The same method can be used to evaluate many other qualities of a database. The invention is not limited to the quality measures discussed above.

After all of the desired qualities are scored, a report of the results is configured. A basic report is a summary description of the catalog. This includes the total number of items (SKUs) in the catalog, number of unique items (Total SKUs—duplicates), the number of categories, number of base and local attributes, and the number of unique local attributes.

The Catalog Grade is a weighted average of all of the individual quality scores mentioned above. Preferably, all grades use a 0–10 scale, with 10 being the best possible score. The user may define the weights assigned to each component, though standardized weighting values are preferred in order to facilitate catalog comparisons.

While this invention has been particularly shown and described with references to a preferred embodiment thereof, it will be understood by those skilled in the art that variations, adaptations and modifications may be made therein without departing from the spirit and scope of the invention as defined by the following claims.

What is claimed is:

1. A computer method comprising:

selecting a first field of a database for analysis, the database comprising a two-dimensional database wherein each row represents a record corresponding to an item in an electronic catalog and each column represents a field corresponding to an attribute of the item;

selecting a second field of the database for analysis;

fetching values for the first field for each record of the database;

comparing the fetched values of the first field to a thesaurus, the thesaurus including a list of synonyms for units of measure and abbreviations;

assigning a first consistency score to the first field based on comparing the fetched values of the first field;

fetching values for the second field for each record of the database;

comparing the fetched values of the second field to the thesaurus;

assigning a second consistency score for the second field based on comparing the fetched values of the second field; and assigning an overall consistency score for the database by combing the first consistency score and the second consistency score.

2. The method of claim 1 further comprising:

ranking the first field and the second field in order of importance; and weighting the first consistency score and the second consistency score based on the respective ranks of the first field and the second field.

3. The method of claim 2 wherein weighting the first consistency score and the second consistency score based on the rank of each field comprises assigning a weight to each field based on the rank of the field and multiplying the total points assigned to the field by the weight.

4. The method of claim 3 further comprising classifying fetched values for the first field into types, counting the number of each value type for the first field and assigning a comprehensibility score based on the number of each value type for the first field.

5. The method of claim 4 wherein the value types include one or more of nouns and adjectives.

6. The method of claim 4 wherein assigning a comprehensibility score includes forming a ratio of value types in the first field to other value types in the first field and comparing the ratio to a desired ratio.

7. The method of claim 1 further comprising:

assigning a first completeness score for the first field by comparing the fetched values for the first field by assigning points for each non-null value so that the first completeness score corresponds to the number of non-null values for all records in the first field;

assigning a second completeness score for the second field by assigning points for each non-null value so that the second completeness score corresponds to the number of non-null values for all records in the second field; and assigning an overall completeness score for the database by combining the first completeness score and the second completeness score.

8. The method of claim 7 wherein the first field corresponds to units of measure, and wherein assigning a first consistency score includes assigning points for each use of an alternate expression for the same unit of measure.

9. The method of claim 1 wherein assigning a first consistency score comprises assigning points for each fetched value that does not match a thesaurus value so that the first consistency score corresponds to the number of non-matching values for all records for the first field.

10. The method of claim 9 wherein the first field contains values that are abbreviations, wherein the thesaurus contains alternative abbreviations with the same meaning and wherein assigning a first consistency score includes assigning points for each use of an alternate abbreviation for the same meaning.

11. The method of claim 1 further comprising assigning a comprehensibility score for the first field by comparing the fetched values for the first field to the thesaurus and assigning points for each fetched value that does not match a thesaurus value so that the comprehensibility score corresponds to the number of non-matching values for all records for the first field.

12. A machine-readable medium having stored thereon data representing sequences of instructions which, when executed by a processor, cause the processor to perform the steps of:

selecting a first field of a database for analysis, the database comprising a two-dimensional database wherein each row represents a record corresponding to an item in an electronic catalog and each column represents a field corresponding to an attribute of the item;

selecting a second field of the database for analysis;

fetching values for the first field for each record of the database;

comparing the fetched values of the first field to a thesaurus, the thesaurus including a list of synonyms for units of measure and abbreviations;

assigning a first consistency score to the first field based on comparing the fetched values of the first field;

fetching values for the second field for each record of the database;

comparing the fetched values of the second field to the thesaurus;

assigning a second consistency score for the second field based on comparing the fetched values of the second field; and assigning an overall consistency score for the database by combining the first consistency score and the second consistency score.

13. The medium of claim 12 further comprising:

ranking the first field and the second field in order of importance; and weighting the first consistency score and the second consistency score based on the respective ranks of the first field and the second field.

14. The medium of claim 13 wherein weighting the first consistency score and the second consistency score based on the rank of each field comprises assigning a weight to each field based on the rank of the field and multiplying the total points assigned to the field by the weight.

15. The medium of claim 12 further comprising:

assigning a first completeness score for the first field by comparing the fetched values for the first field by assigning points for each non-null value so that the first completeness score corresponds to the number of non-null values for all records in that field;

assigning a second completeness score for the second field by assigning points for each non-null value so that the second completeness score corresponds to the number of non-null values for all records in the second field; and assigning an overall completeness score for the database by combining the first completeness score and the second completeness score.

16. The medium of claim 12 wherein assigning a first consistency score comprises assigning points for each fetched value that does not match a thesaurus value so that the first consistency score corresponds to the number of non-matching values for all records for the first field.

17. The medium of claim 16 wherein the first field corresponds to units of measure, and wherein assigning a score includes assigning points for each use of an alternate expression for the same unit of measure.

18. The medium of claim 16 wherein the first field contains values that are abbreviations, wherein the thesaurus contains alternative abbreviations with the same meaning and wherein assigning a first consistency score includes assigning points for each use of an alternate abbreviation for the same meaning.

19. The medium of claim 12 further comprising assigning a comprehensibility score for the first field by comparing the fetched values for the first field to the thesaurus; and assigning points for each fetched value that does not match a thesaurus value so that the comprehensibility score a for the first field corresponds to the number of non-matching values for all records for the first field.

20. The medium of claim 19 further comprising classifying fetched values for the first field into types, counting the number of each value type for the first field and assigning a comprehensibility score based on the number of each value type for the first field.

21. The medium of claim 20 wherein the value types include one or more of nouns and adjectives.

22. The medium of claim 20 wherein assigning a comprehensibility score based on the number of each value type includes forming a ratio of value types in the first field to other value types in the first field and comparing the ratio to a desired ratio.

* * * * *